(12) United States Patent
Cheng et al.

(10) Patent No.: US 10,848,255 B2
(45) Date of Patent: Nov. 24, 2020

(54) METHOD AND APPARATUS FOR REPORTING RSRP

(71) Applicant: FG Innovation Company Limited, Tuen Mun (HK)

(72) Inventors: Chien-Chun Cheng, Taipei (TW); Yu-Hsin Cheng, Hsinchu (TW); Chie-Ming Chou, Hsinchu (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/507,039

(22) Filed: Jul. 10, 2019

(65) Prior Publication Data

US 2020/0021373 A1    Jan. 16, 2020

Related U.S. Application Data

(60) Provisional application No. 62/695,998, filed on Jul. 10, 2018.

(51) Int. Cl.
*H04B 17/327* (2015.01)
*H04W 24/10* (2009.01)

(52) U.S. Cl.
CPC .......... *H04B 17/327* (2015.01); *H04W 24/10* (2013.01)

(58) Field of Classification Search
CPC .......................... H04B 17/327; H04W 24/10
See application file for complete search history.

(56) References Cited

U.S. PATENT DOCUMENTS

| | | | |
|---|---|---|---|
| 2016/0037550 A1* | 2/2016 | Barabell | H04B 17/318 455/450 |
| 2017/0164301 A1* | 6/2017 | Jeon | H04W 52/243 |
| 2020/0059589 A1* | 2/2020 | Liu | H04N 5/37452 |

* cited by examiner

*Primary Examiner* — Saad A. Waqas
(74) *Attorney, Agent, or Firm* — ScienBiziP, P.C.

(57) ABSTRACT

A user equipment (UE) is provided. The UE includes one or more non-transitory computer-readable media having computer-executable instructions embodied thereon and at least one processor coupled to the one or more non-transitory computer-readable media. The at least one processor is configured to execute the computer-executable instructions to perform following actions: obtain a first measured RSRP value; receive a first message from a base station; select a first quantization table from one or more quantization tables according to the first message, wherein the one or more quantization tables includes a non-uniform quantization table; convert the first measured RSRP value to a first quantized RSRP value according to the first quantization table; and send the first quantized RSRP value to the base station.

24 Claims, 6 Drawing Sheets

METHOD AND APPARATUS FOR REPORTING RSRP

CROSS-REFERENCE TO RELATED APPLICATION(S)

The present application claims the benefit of and priority to a provisional U.S. Patent Application Ser. No. 62/695,998, filed on Jul. 10, 2018, entitled "Method of non-uniform quantization on differential beam reporting," (hereinafter referred to as "US74461 application"). The disclosure of the US74461 application is hereby incorporated fully by reference into the present application.

FIELD

The present disclosure generally relates to wireless communication, and more particularly, to a method for reporting Reference Signal Received Power (RSRP) in the next generation wireless communication networks.

BACKGROUND

Various efforts have been made to improve different aspects of wireless communications, such as data rate, latency, reliability and mobility, for the next generation (e.g., 5G New Radio (NR)) wireless communication systems. In a cellular network, when a user equipment (UE) moves from cell to cell, the UE may perform cell selection/reselection and handover procedures. The UE may detect and monitor the presence of multiple cells and perform cell reselection to ensure that it is camped on the most suitable cell. A UE camped on a particular cell may monitor the System Information and Paging of that cell, as well as the quality and strength of other cells to determine if a cell reselection is required.

In monitoring the cells, one parameter measured by the UE on a reference signal is the Reference Signal Receiver Power (RSRP). The RSRP may be an average power received from a single reference signal. The RSRP measurement, which is normally expressed in dBm, may be utilized to rank different candidate cells in accordance with their signal strength. A typical range of RSRP is around −44 dBm (good quality) to −140 dBm (poor quality). The UE may report the measured RSRP to a base station (e.g., a gNB) in a quantized manner. That is, the UE may use a quantization table to convert the measured RSRP to a quantized output value. Resolution of such a quantization table may depend on the number of bits that is used in the quantized output value reported by the UE. A quantization process may result in quantization error, which is the difference between the input value and its quantized value. There is a need for reducing the quantization error during the process of reporting RSRP for the next generation wireless communication networks.

SUMMARY

The present disclosure is directed to the method for reporting RSRP for the next generation wireless communication networks.

According to an aspect of the present disclosure, a UE is provided. The UE includes one or more non-transitory computer-readable media having computer-executable instructions embodied thereon and at least one processor coupled to the one or more non-transitory computer-readable media. The at least one processor is configured to execute the computer-executable instructions to perform following actions: obtain a first measured RSRP value; receive a first message from a base station; select a first quantization table from one or more quantization tables according to the first message, wherein the one or more quantization tables includes a non-uniform quantization table; convert the first measured RSRP value to a first quantized RSRP value according to the first quantization table; and send the first quantized RSRP value to the base station.

According to another aspect of the present disclosure, a method of reporting RSRP performed by a UE is provided. The method includes the following actions: obtaining a first measured RSRP value; receiving a first message from a base station; selecting a first quantization table from one or more quantization tables according to the first message, wherein the one or more quantization tables includes a non-uniform quantization table; converting the first measured RSRP value to a first quantized RSRP value according to the first quantization table; and sending the first quantized RSRP value to the base station.

BRIEF DESCRIPTION OF THE DRAWINGS

Aspects of the example disclosure are best understood from the following detailed description when read with the accompanying figures. Various features are not drawn to scale, dimensions of various features may be arbitrarily increased or reduced for clarity of discussion.

DETAILED DESCRIPTION

Figure 1:
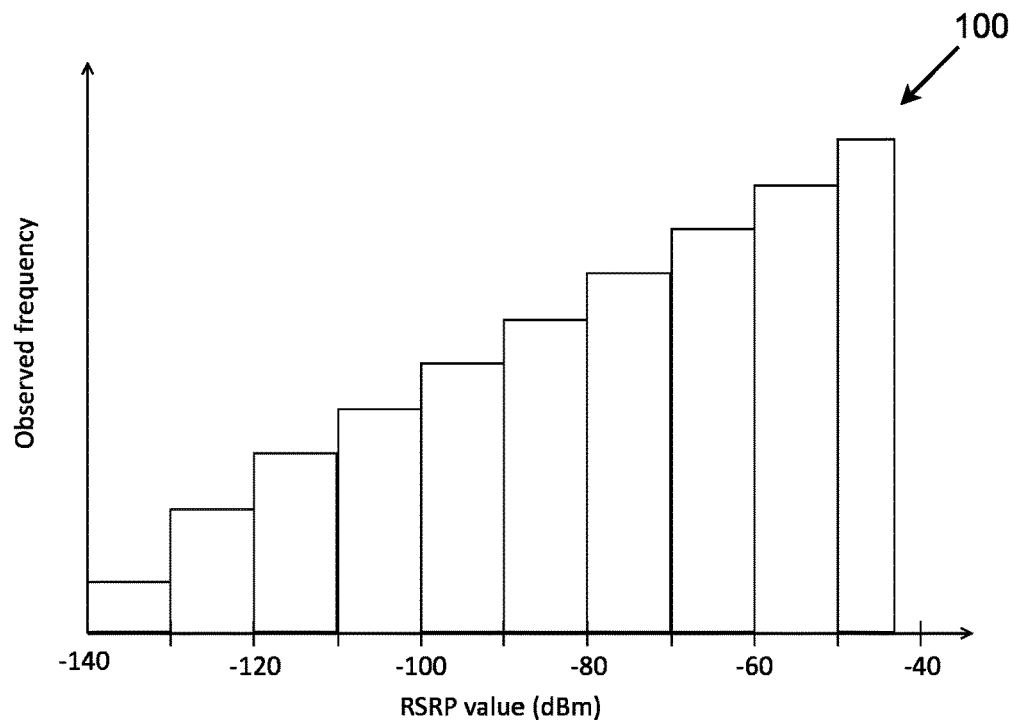
FIG. 1 is a diagram illustrating a histogram of the largest RSRP value for a 2-beam group based reporting, according to an example implementation of the present application.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features are identified (although, in some examples, not shown) by numerals in the example figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent. The expression "at least one of A, B and C" or "at least one of the following: A, B and C" means "only A, or only B, or only C, or any combination of A, B and C."

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of applications specific integrated circuitry (ASIC), programmable logic arrays, and/or using one or more digital signal processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to random access memory (RAM), read only memory (ROM), erasable programmable read-only memory (EPROM), electrically erasable programmable read-only memory (EEPROM), flash memory, compact disc read-only memory (CD-ROM), magnetic cassettes, magnetic tape, magnetic disk storage, or any other equivalent medium capable of storing computer-readable instructions.

A radio communication network architecture (e.g., a long term evolution (LTE) system, an LTE-Advanced (LTE-A) system, an LTE-Advanced Pro system, or a 5G New Radio (NR) Radio Access Network) typically includes at least one base station, at least one user equipment (UE), and one or more optional network elements that provide connection towards a network. The UE communicates with the network (e.g., a core network (CN), an evolved packet core (EPC) network, an Evolved Universal Terrestrial Radio Access network (E-UTRAN), a 5G Core (5GC), or an internet), through a radio access network (RAN) established by one or more base stations.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, a vehicle, or a personal digital assistant (PDA) with wireless communication capability. The UE is configured to receive and transmit signals over an air interface to one or more cells in a radio access network.

A base station may be configured to provide communication services according to at least one of the following radio access technologies (RATs): Worldwide Interoperability for Microwave Access (WiMAX), Global System for Mobile communications (GSM, often referred to as 2G), GSM EDGE radio access Network (GERAN), General Packet Radio Service (GRPS), Universal Mobile Telecommunication System (UMTS, often referred to as 3G) based on basic wideband-code division multiple access (W-CDMA), high-speed packet access (HSPA), LTE, LTE-A, eLTE (evolved LTE, e.g., LTE connected to 5GC), New Radio (NR, often referred to as 5G), and/or LTE-A Pro. However, the scope of the present application should not be limited to the above mentioned protocols.

A base station may include, but is not limited to, a node B (NB) as in the UMTS, an evolved node B (eNB) as in the LTE or LTE-A, a radio network controller (RNC) as in the UMTS, a base station controller (BSC) as in the GSM/GERAN, a ng-eNB as in an E-UTRA base station in connection with the 5GC, a next generation node B (gNB) as in the 5G-RAN, and any other apparatus capable of controlling radio communication and managing radio resources within a cell. The base station may connect to serve the one or more UEs through a radio interface to the network.

The base station is operable to provide radio coverage to a specific geographical area using a plurality of cells forming the radio access network. The base station supports the operations of the cells. Each cell is operable to provide services to at least one UE within its radio coverage. More specifically, each cell (often referred to as a serving cell) provides services to serve one or more UEs within its radio coverage (e.g., each cell schedules the downlink and optionally uplink resources to at least one UE within its radio coverage for downlink and optionally uplink packet transmissions). The base station can communicate with one or more UEs in the radio communication system through the plurality of cells. A cell may allocate sidelink (SL) resources for supporting proximity service (ProSe) or Vehicle to Everything (V2X) service. Each cell may have overlapped coverage areas with other cells.

As discussed above, the frame structure for NR is to support flexible configurations for accommodating various next generation (e.g., 5G) communication requirements, such as enhanced mobile broadband (eMBB), massive machine type communication (mMTC), ultra reliable communication and low latency communication (URLLC), while fulfilling high reliability, high data rate and low latency requirements. The orthogonal frequency-division multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) low-density parity-check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resource may also be provided in an NR frame to support ProSe services or V2X services.

In one implementation, group based beam reporting may be supported for RSRP reporting. In the procedure of group based beam reporting, the UE may measure multiple RSRP values based on multiple beams. Among the multiple measured RSRP values, the UE may determine the largest RSRP value, and then obtain one or more differential RSRP values by calculating a difference value between the largest RSRP value and the other measured RSRP values. For example, for a 2-beam group based beam reporting, the UE may first decide the largest RSRP value by comparing the two measured RSRP values, and then calculate the differential RSRP value by subtracting the larger RSRP value from the smaller RSRP value.

The function of group based beam reporting may be indicated by a higher layer parameter, such as the groupBasedBeamReporting parameter. In one implementation, the differential layer-1 RSRP (L1-RSRP) based reporting may be calculated based on two distinct tables: a 7-bit table for the largest value of RSRP and a 4-bit table for the rest. The L1-RSRP may also be referred to as RSRP in the following description for simplification. In one implementation, if the higher layer parameter is configured as "enabled," the UE may use the differential L1-RSRP based reporting, where the largest measured value of the L1-RSRP may be quantized to a 7-bit value in the the range of [−140, −44] dBm with 1dB step size, and the differential L1-RSRP may be quantized to a 4-bit value. The differential L1-RSRP value may be computed with 2 dB step size with a reference to the largest measured L1-RSRP value which is part of the same L1-RSRP reporting instance. It should be noted that the number of bits for representing the quantized output is exemplary rather than limiting. For example, in other implementations, the number of bits used for the quantized differential RSRP value may be greater than or less than 4 bits. In the following description, the 7-bit quantization used for the largest RSRP value, and the 4-bit quantization used for the differential RSRP value will be used only as examples and the number of bits can be different in different implementations.

Table 1 below shows an example 7-bit RSRP table based on uniform quantization, with a step size equal to 1dB. Table 1 may be used to quantize the largest measured RSRP value into a 7-bit value.

TABLE 1

A 7-bit RSRP table based on uniform quantization

| Quantized Output | RSRP Range |
|---|---|
| 0000000 | RSRP ≤ −140 dBm |
| 0000001 | −140 dBm < RSRP ≤ −139 dBm |
| ... | ... |
| 1100000 | −45 dBm < RSRP ≤ −44 dBm |
| 1100001 | −44 dBm < RSRP |
| 1100011 | Reserved |
| ... | ... |
| 1111111 | Reserved |

Table 2 below shows an example 4-bit RSRP table based on uniform quantization, with a step size equal to 2 dB. Table 2 may be used to quantize the differential RSRP value into a 4-bit value.

TABLE 2

A 4-bit RSRP table based on uniform quantization

| Quantized Output | RSRP Range |
|---|---|
| 0000 | Differential RSRP ≤ −28 dBm |
| 0001 | −28 dBm < Differential RSRP ≤ −26 dBm |
| ... | ... |
| 1101 | −4 dBm < Differential RSRP ≤ −2 dBm |
| 1110 | −2 dBm < Differential RSRP ≤ 0 dBm |
| 1111 | Reserved |

The uniform quantization, however, may not be the optimum quantization method for quantizing the largest measured RSRP value. For instance, when the measured RSRP values are uniformly distributed in the range of −44 dBm to −140 dBm, the largest value may not be uniformly distributed. In fact, the largest value tends to be distributed more likely closer to the larger values in the measured range than the smaller ones. In other words, the uniform quantization may waste most of the quantization bits for less likely values when quantizing the largest measured RSRP value.

FIG. 1 is a diagram 100 illustrating a histogram of the largest RSRP value for a 2-beam group based reporting, according to an example implementation of the present application. FIG. 1 shows how the largest RSRP values distribute in the range of −44 dBm to −140 dBm. In one implementation, group based beam reporting may be used for 2 beams. As an example, when there are two measured RSRP values for each trail, and each of the RSRP values is randomly generated based on the uniform distribution within the range of −44 dBm to −140 dBm, the largest value may be calculated in every measurement trail. Measurement trails may be repeated (e.g., over thousands of times) to calculate the histogram on the largest RSRP values from every trail. As a result, as shown in FIG. 1, the largest RSRP values may distribute as a triangle shape (linear growth) in the range where its larger values, e.g., −44 dBm, may have a higher observed frequency than its smaller values, e.g., −140 dBm.

The same observation may be found for the differential RSRP values. The reason is that since the largest measured RSRP value is not uniformly distributed in the range, the differential L1-RSRP, e.g., the power difference between the largest measured RSRP value and the rest of the RSRP values, may not be uniformly distributed as well.

Figure 2:
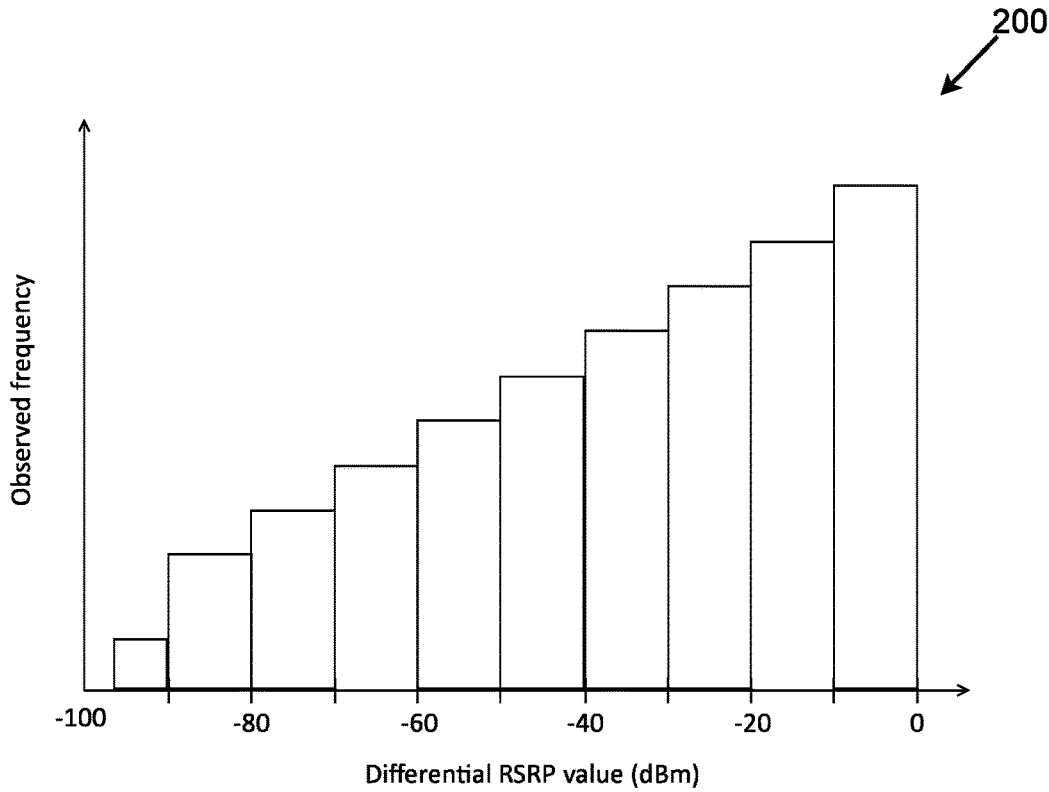
FIG. 2 is a diagram illustrating a histogram of the differential RSRP value for a 2-beam group based reporting, according to an example implementation of the present application.

FIG. 2 is a diagram 200 illustrating a histogram of the differential RSRP value for a 2-beam group based reporting, according to an example implementation of the present application. FIG. 2 shows how the differential RSRP values distribute in the range of 0 to −96 dBm. Following the same setup as described above (e.g., randomly generate two beams within the range based on uniform distribution), a histogram may be made on the differential values between the largest RSRP value and the rest of RSRP values. As a result, as shown in FIG. 2, the differential values may have a non-uniform distribution, similar to the histogram of the largest RSRP values shown in FIG. 1, as a triangle shape (linear growth).

Based on the observation made in FIG. 1 and FIG. 2, the 7-bit RSRP table and the 4-bit differential RSRP table based on uniform quantization may not be optimum because the input values, either the largest RSRP values or the differential RSRP values, are not uniformly distributed. Several implementations are provided below that aim for further optimization based on non-uniform quantization schemes.

As can be seen in FIG. 1, for the largest RSRP value, more RSRP values are found close to the upper bound within the range (e.g., −44 dBm), and fewer RSRP values are found close to the lower bound within the range (e.g., −140 dBm). As such, to reduce the quantization error, a smaller quantization step size may be used (e.g., to achieve higher resolution) for values closer to the upper bound, and a larger quantization step size may be used (e.g., lower resolution) for values closer to the lower bound.

In one implementation, a non-uniform quantization table may be used for the measured RSRP value (e.g., the largest RSRP value in a group based beam reporting, or the single measured RSRP value if group based beam reporting is not enabled). The non-uniform quantization table may map multiple RSRP ranges to multiple quantized outputs, respectively. The multiple RSRP ranges may include a first RSRP range and a second RSRP range. A first power level of the first RSRP range may be lower than a second power level of the second RSRP range, and the first RSRP range may be larger than the second RSRP range.

In one implementation, a non-uniform quantization table may be used for the measured RSRP value. The non-uniform quantization table may map multiple RSRP ranges to multiple quantized outputs respectively. Each RSRP range may have a corresponding power level, and the RSRP range may decrease as the corresponding power level increases.

Case #1: Tables for 2 RSRP Values with Reserved Codepoints

Case #1-1: 7-Bit RSRP Table

In one implementation, a non-uniform quantization table (e.g., with 7-bit quantized outputs) may be generated by the following procedure. First, the RSRP measured values may be generated by uniform distribution in the range of −44 dBm to −140 dBm. Then the largest RSRP values may be found. The quantization table may be optimized based on the Lloyd algorithm. This scheme may find the optimum intervals (e.g. the optimum RSRP range) via iteratively minimizing the quantization errors.

In one implementation, a non-uniform quantization table A11 in a compact form may be given below. Table A11=[−137.379, −135.741, −134.324, −133.003, −131.731, −130.494, −129.301, −128.150, −127.014, −125.876, −124.751, −123.664, −122.619, −121.605, −120.599, −119.595, −118.592, −117.601, −116.609, −115.600, −114.597, −113.608, −112.638, −111.675, −110.709, −109.746, −108.790, −107.844, −106.892, −105.929, −104.965, −103.998, −103.031, −102.072, −101.123, −100.176, −99.232, −98.300, −97.374, −96.448, −95.519, −94.578, −93.626, −92.679, −91.729, −90.768, −89.809, −88.858, −87.913, −86.974, −86.042, −85.120, −84.206, −83.292, −82.378, −81.468, −80.555, −79.643, −78.737, −77.836, −76.935, −76.029, −75.113, −74.194, −73.282, −72.377, −71.471, −70.560, −69.651, −68.749, −67.855, −66.972, −66.093, −65.211, −64.324, −63.440, −62.563, −61.688, −60.810, −59.921, −59.024, −58.126, −57.228, −56.324, −55.422, −54.528, −53.627, −52.720, −51.813, −50.917, −50.036, −49.165, −48.294, −47.425, −46.560, −45.703, −44.849] (unit: dBm)

Each entry in the above table A11 may be referred to as A11(i), where i is a positive integer. For example, A11(1)=−137.379 dBm, A11(2)=−135.741 dBm, and so on. The first interval (e.g., RSRP range) of the non-uniform quantization table A11 may correspond to RSRP≤A11(1). Subsequent intervals of the non-uniform quantization table A11 may be represented by A11(i−1)<RSRP≤A11(i). Table A11 may be represented in another format as shown in Table 3 below.

TABLE 3

A 7-bit RSRP table based on non-uniform quantization

| Quantized Output | RSRP ranges |
| --- | --- |
| 0000000 | RSRP ≤ −137.379 dBm |
| 0000001 | −137.379 dBm < RSRP ≤ −135.741 dBm |
| ... | ... |
| 1100000 | −45.703 dBm < RSRP ≤ −44.849 dBm |
| 1100001 | −44.849 dBm < RSRP |
| 1100011 | Reserved |
| ... | ... |
| 1111111 | Reserved |

To have a fair comparison between Table 1 (uniform quantization) and Table 3 (non-uniform quantization), the number of reserved codepoints are kept the same in the both schemes (e.g., bit range from 1100011 to 1111111 are reserved), in a sense that both schemes have the same total number of quantization steps.

Figure 3:
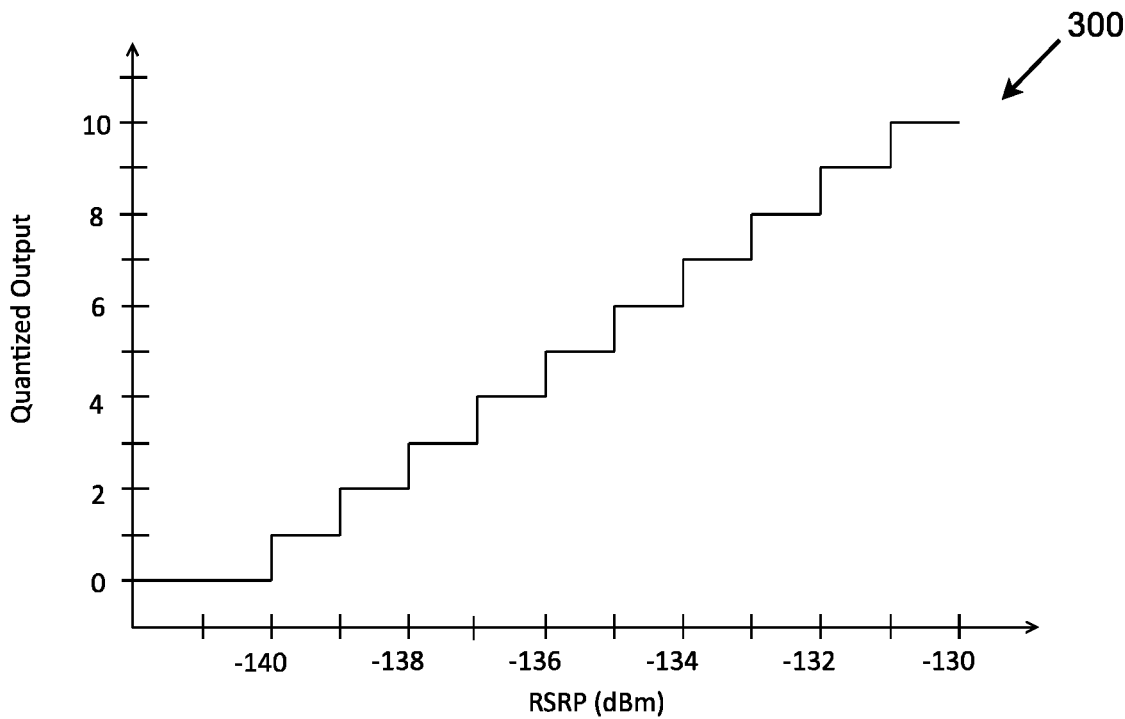
FIG. 3 is a diagram illustrating a mapping relation between the largest RSRP value and the quantized output using uniform quantization, according to an example implementation of the present application.

FIG. 3 is a diagram 300 illustrating a mapping relation between the largest RSRP value and the quantized output using a uniform quantization table (e.g., Table 1), according to an example implementation of the present application. In FIG. 3, the horizontal axis represents the input RSRP values, and the vertical axis represents the quantized output value in decimal notation (e.g., 0000000 is 0, 0000001 is 1, 0000010 is 2, and so on). Similar representation may also be used in FIG. 4 to FIG. 6. As shown in FIG. 3, the uniform quantization uses equal step size (e.g., 1 dB) for all input RSRP values.

Figure 4:
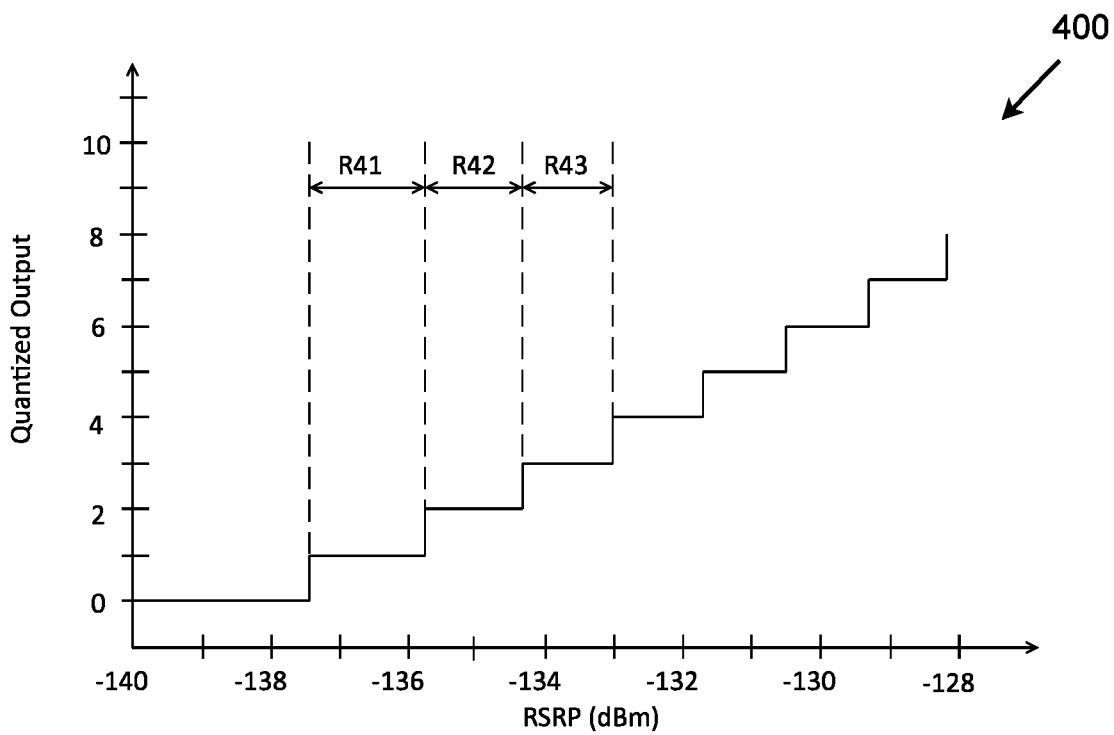
FIG. 4 is a diagram illustrating a mapping relation between the largest RSRP value and the quantized output using non-uniform quantization, according to an example implementation of the present application.

FIG. 4 is a diagram 400 illustrating a mapping relation between the largest RSRP value and the quantized output using a non-uniform quantization table (e.g., Table 3), according to an example implementation of the present application. In one implementation, the non-uniform quantization scheme may use larger step sizes for the smaller input RSRP values. As shown in FIG. 4, the RSRP range R41 (e.g., the length of the interval [−137.379, −135.741] is 1.638 dB) may be larger than the RSRP range R42 (e.g. the length of the interval [−135.741, −134.324] is 1.417 dB), and the power level of the RSRP range R41 (e.g., from −137.379 dBm to −135.741 dBm) may be lower than the power level of the RSRP range R42 (e.g., from −135.741 dBm to −134.324 dBm). The RSRP range R42 may be corresponding to a better signal quality compared to the RSRP range R41. Similarly, the RSRP range R42 may be larger than the RSRP range R43, and the power level of the RSRP range R42 may be lower than the power level of the RSRP range R43 (The RSRP range R43 may be corresponding to a better signal quality compared to the RSRP range R42). In one implementation, the RSRP range may gradually decrease as the corresponding power level gradually increases.

The performance gain may be evaluated in terms of mean square error (MSE) between the input RSRP values and the quantized codepoints. As shown in Table 4 below, the non-uniform quantization table can decrease the MSE up to 14%, compared to the uniform quantization table.

TABLE 4

Performance Comparison for 7-bit RSRP Tables

| Quantization schemes | MSE | Performance Gain |
|---|---|---|
| Uniform quantization (Table 1) | 0.083334 | baseline |
| Non-uniform quantization (Table 3) | 0.070934 | 14.88% |

Case #1-2: 4-Bit Differential RSRP Table—Non-Uniform Quantization

In one implementation, a non-uniform quantization table (e.g., with 4-bit quantized outputs) for differential RSRP value may be generated by the following procedure. First, the RSRP measured values may be generated by uniform distribution in the range of −44 dBm to −140 dBm. Then the largest RSRP values may be found, and the differential RSRP values may be calculated based on the difference between the largest RSRP value and the rest of the RSRP values. The quantization table may be optimized based on the Lloyd algorithm. This scheme may find the optimum intervals (e.g. the optimum RSRP range) via iteratively minimizing the quantization errors.

In one implementation, a non-uniform quantization table A12 in a compact form may be given below. Table A12=[−76.7745; −67.0960; −59.2972; −52.4398; −46.2403; −40.5345; −35.1733; −30.1235; −25.2923; −20.6900; −16.2706; −11.9909; −7.8758; −3.8705] (unit: dBm)

Table A12 may be represented in another format as shown in Table 5 below.

TABLE 5

A 4-bit differential RSRP table based on non-uniform quantization

| Quantized Output | RSRP Range |
|---|---|
| 0000 | Differential RSRP ≤ −76.7745 dBm |
| 0001 | −76.7745 dBm < Differential RSRP ≤ −67.0960 dBm |
| . . . | . . . |
| 1101 | −7.8758 dBm < Differential RSRP ≤ −3.8705 dBm |
| 1110 | −3.8705 dBm < Differential RSRP |
| 1111 | Reserved |

Figure 5:
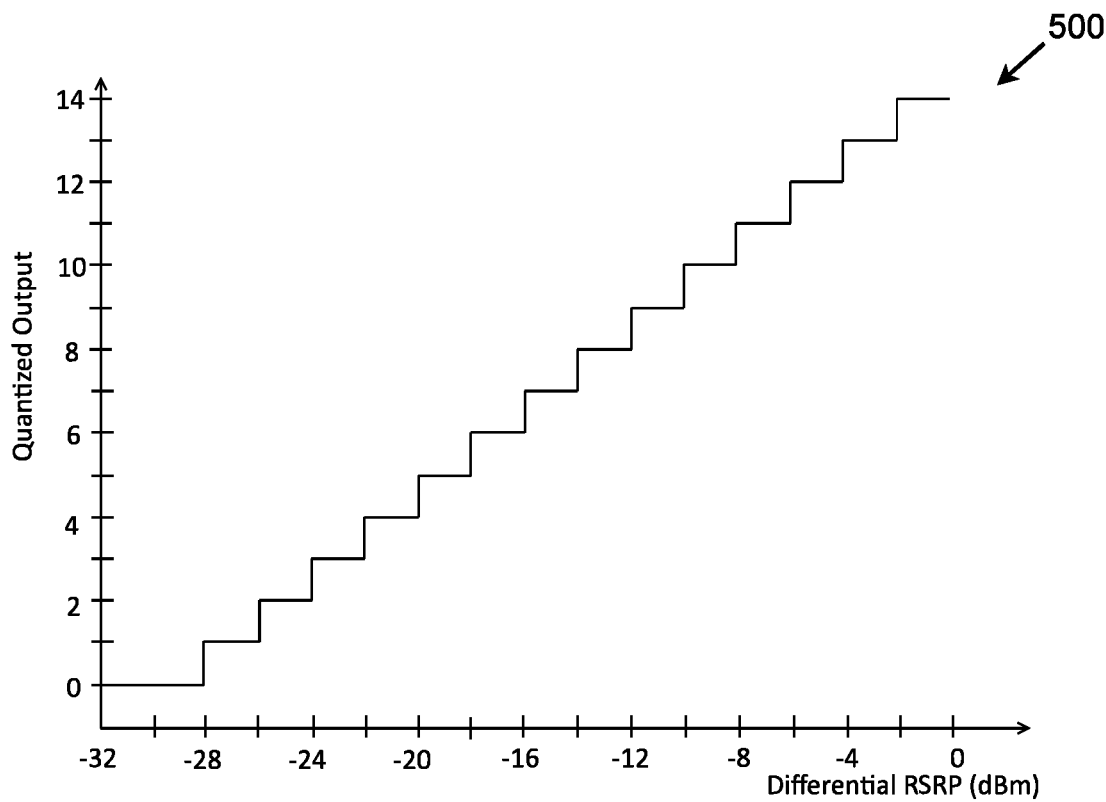
FIG. 5 is a diagram illustrating a mapping relation between the differential RSRP value and the quantized output using uniform quantization, according to an example implementation of the present application.

FIG. 5 is a diagram 500 illustrating a mapping relation between the differential RSRP value and the quantized output using a uniform quantization table (e.g., Table 2), according to an example implementation of the present application. As shown in FIG. 5, the uniform quantization uses equal step size (e.g., 2 dB) for all input differential RSRP values.

Figure 6:
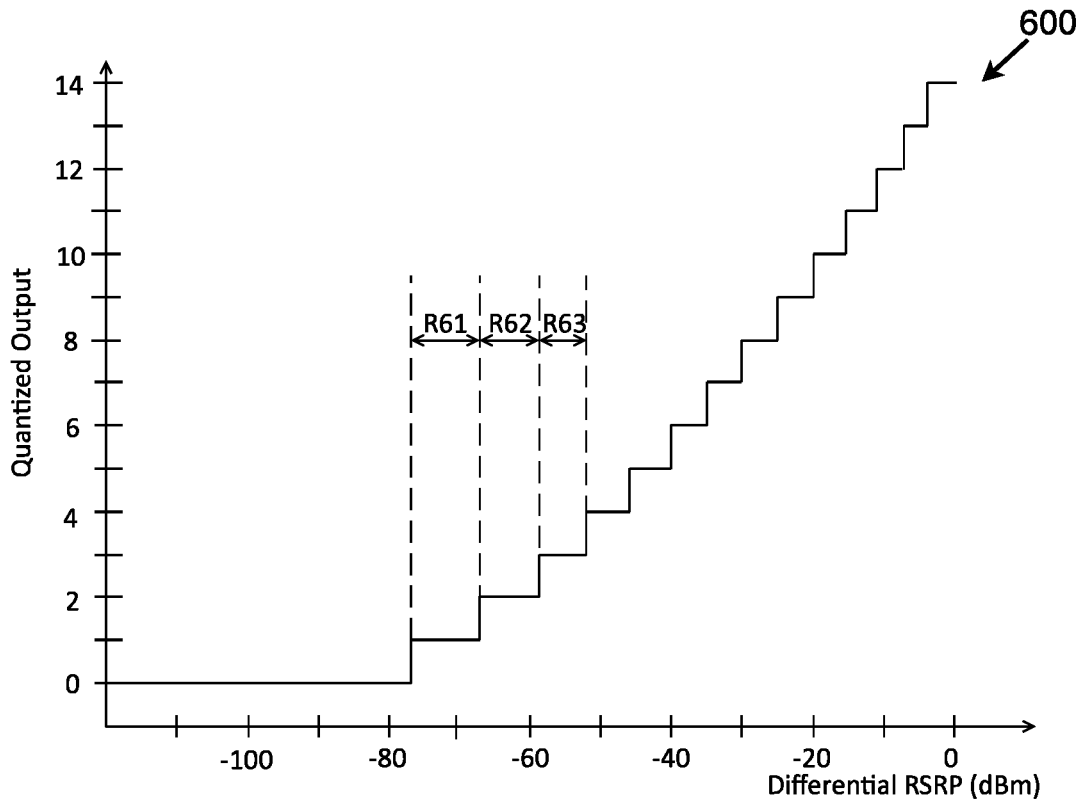
FIG. 6 is a diagram illustrating a mapping relation between the differential RSRP value and the quantized output using non-uniform quantization, according to an example implementation of the present application.

FIG. 6 is a diagram 600 illustrating a mapping relation between the differential RSRP value and the quantized output using a non-uniform quantization table (e.g., Table 5), according to an example implementation of the present application. The non-uniform quantization scheme may use larger step sizes for the smaller input differential RSRP values. As shown in FIG. 6, the RSRP range R61 (e.g., the length of the interval [−76.7745, −67.0960] is 9.6785 dB) may be larger than the RSRP range R62 (e.g. the length of the interval [−67.0960, −59.2972] is 7.7988 dB), and the power level of the RSRP range R61 (e.g., from −76.7745 dBm to −67.0960 dBm) may be lower than the power level of the RSRP range R62 (e.g., from −67.0960 dB to −59.2972 dBm). The RSRP range R61 may be corresponding to a larger difference between the largest RSRP value and the rest of the RSRP values compared to the RSRP range R62. Similarly, the RSRP range R62 may be larger than the RSRP range R63, and the power level of the RSRP range R62 may be lower than the power level of the RSRP range R63 (The RSRP range R62 may be corresponding to a larger difference between the largest RSRP value and the rest of the RSRP values compared to the RSRP range R63). In one implementation, the RSRP range may gradually decrease as the corresponding power level gradually increases.

The differential RSRP values may distribute in the range of 0 to −96 dBm. As can be seen in Table 2 and FIG. 5, for the uniform quantization with a step size of 2 dB, the minimum quantized value may only achieve −28 dBm. There may be several quantization errors for the differential RSRP values ranging from −29 dBm to −96 dBm. In contrast, as can be seen in Table 5 and FIG. 6, for the non-uniform quantization, the minimum quantized value may achieve around −80 dBm. Because a large range is covered, the MSE of the quantization process may be reduced.

Case #1-3: 4-Bit Differential RSRP Table—Uniform Quantization

In one implementation, a uniform quantization table (e.g., a 4-bit quantization table) may be used for the differential RSRP values. The uniform quantization table may map multiple RSRP ranges to multiple quantized outputs, respectively, and each RSRP range may be equal to a step size. Table 6 below shows a mapping relation between the RSRP ranges and the quantized outputs for uniform distribution with the step size as a parameter.

TABLE 6

A 4-bit differential RSRP table based on uniform quantization

| Quantized Output | RSRP Range |
|---|---|
| 0000 | Differential RSRP ≤ −14 × stepsize dBm |
| 0001 | −14 × stepsize dBm < Differential RSRP ≤ −13 × stepsize dBm |
| . . . | . . . |
| 1101 | −2 × stepsize dBm < Differential RSRP ≤ −1 × stepsize dBm |
| 1110 | −1 × stepsize dBm < Differential RSRP ≤ 0 dBm |
| 1111 | Reserved |

The step size of 2 (as used in Table 2) may be treated as a baseline. The performance gain of different step sizes may be evaluated in MSE between the input RSRP values and the quantized codepoints. Comparison between non-uniform quantization and uniform quantization with different step sizes may be listed in Table 7 below.

TABLE 7

Performance comparison for 4-bit differential RSRP tables

| Quantization schemes | | MSE | Performance Gain |
|---|---|---|---|
| Uniform quantization | with step size of 2 | 363.11927 | baseline |
| | with step size of 3 | 137.02681 | 62.264% |
| | with step size of 4 | 38.44425 | 89.413% |
| | with step size of 5 | 7.40589 | 97.960% |

TABLE 7-continued

Performance comparison for 4-bit differential RSRP tables

| Quantization schemes | MSE | Performance Gain |
|---|---|---|
| with step size of 6 | 3.08990 | 99.149% |
| with step size of 7 | 4.08376 | 98.875% |
| with step size of 8 | 5.33785 | 98.530% |
| Non-uniform quantization | 3.06006 | 99.157% |

As shown in Table 7, when the step size is greater than 2, the quantization error may be greatly reduced. In one implementation, the step size for uniform quantization may be greater than 2 dB. Moreover, the performance gain may be higher than 97% when the step size is greater than 4 dB. In one implementation, the step size for uniform quantization may range from 5 dB to 8 dB. In addition, the optimum step size may be 6 dB, which can reduce the MSE up to 99%. In one implementation, the step size for uniform quantization may be equal to 6 dB. The main benefit of non-uniform quantization and uniform quantization with step size greater than 2 dB is in reducing MSE in the RSRP range of −29 dBm to −96 dBm.

In one implementation, the step size for uniform quantization may be fixed and stored in the UE. In one implementation, the step size for uniform quantization may be dynamically configured (e.g., by the base station). For example, the UE may receive a message from the base station, and the message may indicate the step size for uniform quantization. The message may be a radio resource control (RRC) message, a medium access control (MAC) control element (CE) message, or a downlink control information (DCI) message.

Case #2: Tables for 4 RSRP Values with Reserved Codepoints

In one implementation, 4 beams may be grouped in a group based beam reporting. The UE may measure 4 RSRP values. Among the 4 measured RSRP values, the UE may determine the largest RSRP value, and then obtain three differential RSRP values by calculating a difference value between the largest RSRP value and the other three measured RSRP values.

Case #2-1: 7-Bit RSRP Table

Figure 7:
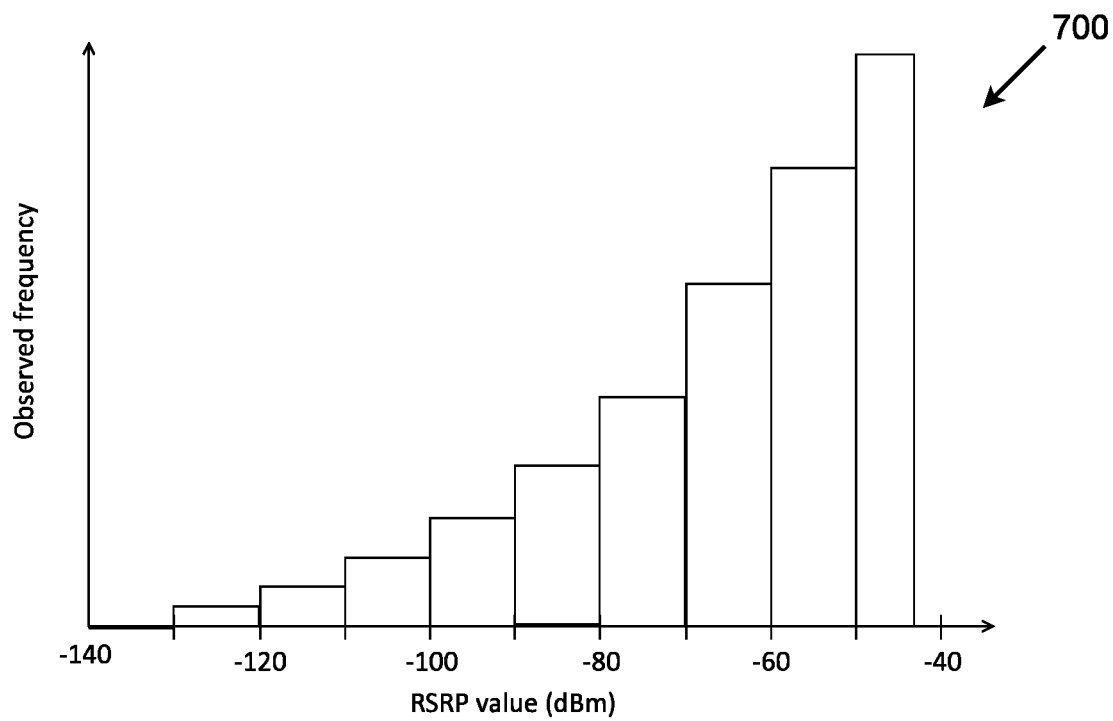
FIG. 7 is a diagram illustrating a histogram of the largest RSRP value for a 4-beam group based reporting, according to an example implementation of the present application.

FIG. 7 is a diagram 700 illustrating a histogram of the largest RSRP value for a 4-beam group based reporting, according to an example implementation of the present application. FIG. 7 shows how the largest RSRP values distribute in the range of −44 dBm to −140 dBm. In this implementation, when there are four measured RSRP values for each trail, and each of the RSRP values is randomly generated based on the uniform distribution within the range of −44 dBm to −140 dBm, the largest value may be calculated in every measurement trail. Measurement trails may be repeated (e.g., over thousands of times) to calculate the histogram on the largest RSRP values from every trail. As a result, as shown in FIG. 7, the histogram shows an exponentially increasing curve from small to large RSRP values. This trend may provide more opportunity to improve quantization quality by a non-uniform quantization table.

Similar to the procedure introduced in Case #1-1 (in Case #2-1, four RSRP values are uniformly generated instead of two RSRP values), a non-uniform quantization table A21 may be given below. Table A21=[−133.153, −130.383, −128.023, −125.836, −123.898, −122.088, −120.365, −118.834, −117.459, −116.157, −114.857, −113.553, −112.294, −111.090, −109.928, −108.799, −107.663, −106.538, −105.430, −104.327, −103.242, −102.165, −101.088, −100.040, −99.017, −97.986, −96.966, −95.952, −94.926, −93.910, −92.925, −91.962, −91.008, −90.074, −89.155, −88.255, −87.376, −86.505, −85.649, −84.802, −83.963, −83.132, −82.303, −81.481, −80.673, −79.873, −79.083, −78.296, −77.509, −76.719, −75.927, −75.132, −74.337, −73.549, −72.768, −71.995, −71.231, −70.477, −69.728, −68.981, −68.234, −67.497, −66.773, −66.052, −65.339, −64.642, −63.950, −63.260, −62.571, −61.878, −61.185, −60.501, −59.821, −59.144, −58.469, −57.797, −57.132, −56.467, −55.805, −55.151, −54.499, −53.853, −53.212, −52.572, −51.933, −51.294, −50.654, −50.014, −49.381, −48.758, −48.143, −47.535, −46.934, −46.335, −45.742, −45.157, −44.576] (unit: dBm)

Each entry in the above table A21 may be referred to as A21(i), where i is a positive integer. For example, A21(1)=−133.153 dBm, A11(2)=−130.383 dBm, and so on. The first interval (e.g., RSRP range) of the non-uniform quantization table A21 may correspond to RSRP A21(1). Subsequent intervals of the non-uniform quantization table A21 may be represented by A21(i−1)<RSRP≤A21(i). Table A21 may be represented in another format as shown in Table 8 below.

TABLE 8

A 7-bit RSRP table based on non-uniform quantization

| Quantized Output | RSRP ranges |
|---|---|
| 0000000 | RSRP ≤ −133.153 dBm |
| 0000001 | −133.153 dBm < RSRP ≤ −130.383 dBm |
| 0000010 | −130.383 dBm < RSRP ≤ −128.023 dBm |
| ... | ... |
| 1100000 | −45.157 dBm < RSRP ≤ −44.576 dBm |
| 1100001 | −44.576 dBm < RSRP |
| 1100011 | Reserved |
| ... | ... |
| 1111111 | Reserved |

Table 8 may have characteristics similar to Table 3. For example, Table 8 may map multiple RSRP ranges to multiple quantized outputs, respectively. The multiple RSRP ranges may include a first RSRP range and a second RSRP range. A first power level of the first RSRP range may be lower than a second power level of the second RSRP range, and the first RSRP range may be larger than the second RSRP range. Each RSRP range may have a corresponding power level, and the RSRP range may decrease as the corresponding power level increases.

The performance gain may be evaluated in terms of MSE between the input RSRP values and the quantized codepoints. As shown in Table 9 below, the non-uniform quantization table can reduce the MSE up to 47% compared to the uniform quantization table.

TABLE 9

Performance Comparison for 7-bit RSRP Tables

| Quantization schemes | MSE | Performance Gain |
|---|---|---|
| Uniform quantization (Table 1) | 0.083316 | baseline |
| Non-uniform quantization (Table 8) | 0.043999 | 47.190% |

Case #2-2: 4-Bit Differential RSRP Table—Non-Uniform Quantization

Figure 8:
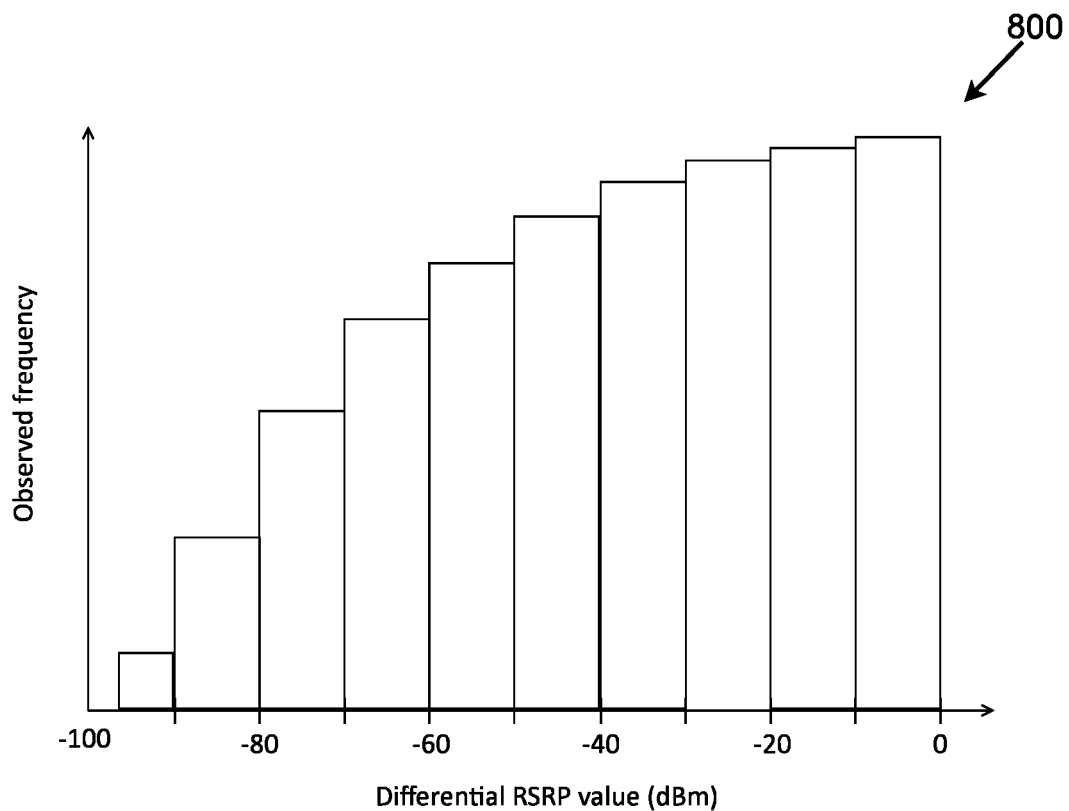
FIG. 8 is a diagram illustrating a histogram of the differential RSRP value for a 4-beam group based reporting, according to an example implementation of the present application.

FIG. 8 is a diagram 800 illustrating a histogram of the differential RSRP value for a 4-beam group based reporting, according to an example implementation of the present application. FIG. 8 shows how the differential RSRP values distribute in the range of 0 to −96 dBm. Following the same setup as described above (e.g., randomly generate four beams within the range based on uniform distribution), a histogram may be made on the differential values between the largest RSRP value and the rest of the RSRP values. As a result, as shown in FIG. 8, the differential values may have a non-uniform distribution, like the histogram of the largest RSRP values, but in an upside-down manner. The differential RSRP values may distribute in the range where its larger values, e.g., 0 dBm, may have a higher observed frequency than its smaller values, e.g., −96 dBm.

In one implementation, a non-uniform quantization table (e.g., with 4-bit quantized outputs) for differential RSRP value may be generated by the following procedure. First, the RSRP measured values may be generated by uniform distribution in the range of −44 dBm to −140 dBm. Then the largest RSRP values may be found, and the differential RSRP values may be calculated based on the difference between the largest RSRP value and the rest of the RSRP values. The quantization table may be optimized based on the Lloyd algorithm. This scheme may find the optimum intervals (e.g. the optimum RSRP range) via iteratively minimizing the quantization errors.

In one implementation, a non-uniform quantization table A22 in a compact form may be given as below. Table A22=[−80.8838; −72.7139; −65.7399; −59.4375; −53.5292; −47.8701; −42.3332; −36.9650; −31.6725; −26.4003; −21.1048; −15.8186; −10.5353; −5.2707] (unit: dBm)

Table A22 may be represented in another format as shown in Table 10 below.

TABLE 10

A 4-bit differential RSRP table based on non-uniform quantization

| Quantized Output | RSRP Range |
|---|---|
| 0000 | Differential RSRP ≤ −80.8838 dBm |
| 0001 | −80.8838 dBm < Differential RSRP ≤ −72.7139 dBm |
| ... | ... |
| 1101 | −10.5353 dBm < Differential RSRP ≤ −5.2707 dBm |
| 1110 | −5.2707 dBm < Differential RSRP |
| 1111 | Reserved |

Table 10 may have characteristics similar to Table 5. For example, Table 10 may map multiple RSRP ranges to multiple quantized outputs, respectively. The multiple RSRP ranges may include a third RSRP range and a fourth RSRP range. A third power level of the third RSRP range may be lower than a fourth power level of the fourth RSRP range, and the third RSRP range may be larger than the fourth RSRP range. Each RSRP range may have a corresponding power level, and the RSRP range may decrease as the corresponding power level increases.

Case #2-3: 4-Bit Differential RSRP Table—Uniform Quantization

In one implementation, a uniform quantization table (e.g., a 4-bit quantization table) may be used for the differential RSRP values. The uniform quantization table may map multiple RSRP ranges to multiple quantized outputs, respectively, and each RSRP range may be equal to a step size. A mapping relation between RSRP ranges and quantized outputs for uniform distribution may be used as shown in FIG. 6.

The step size of 2 (as used in Table 2) may be treated as a baseline. The performance gain of different step sizes may be evaluated in MSE between the input RSRP values and the quantized codepoints. Comparison between non-uniform quantization and uniform quantization with different step sizes (for 4 RSRP group based beam reporting) may be listed in Table 11 below.

TABLE 11

Performance comparison for 4-bit differential RSRP tables

| Quantization schemes | | MSE | Performance Gain |
|---|---|---|---|
| Uniform quantization | with step size of 2 | 547.07609 | baseline |
| | with step size of 3 | 219.73412 | 59.835% |
| | with step size of 4 | 65.09895 | 88.101% |
| | with step size of 5 | 11.87323 | 97.830% |
| | with step size of 6 | 3.18438 | 99.418% |
| | with step size of 7 | 4.07912 | 99.254% |
| | with step size of 8 | 5.32518 | 99.027% |
| Non-uniform quantization | | 3.06006 | 3.22938 |

As shown in Table 11, when the step size is greater than 2, the quantization error may be greatly reduced. In one implementation, the step size for uniform quantization may be greater than 2 dB. Moreover, the performance gain may be higher than 97% when the step size is greater than 4 dB. In one implementation, the step size for uniform quantization may range from 5 dB to 8 dB. In addition, the optimum step size may be 6 dB, which can reduce the MSE up to 99%. In one implementation, the step size for uniform quantization may be equal to 6 dB. In one implementation, the step size for uniform quantization may be fixed and stored in the UE. In one implementation, the step size for uniform quantization may be dynamically configured by the base station. For example, the UE may receive a message from the base station, and the message may indicate the step size for uniform quantization. The message may be an RRC message, a MAC CE message, or a DCI message.

Case #3: Tables for 2 RSRP Values without Reserved Codepoints

In one implementation, for a non-uniform quantization scheme, it is possible to fully use 7 bits and 4 bits to build quantization tables without any reserved codepoints.

Case #3-1: 7-Bit RSRP Table

Similar to the procedure introduced in Case #1-1 (two RSRP values uniformly generated), a non-uniform quantization table A31 (no reserved codepoints) may be given below. Table A31=[−137.408; −136.055; −134.982; −134.050; −133.218; −132.439; −131.676; −130.925; −130.187; −129.469; −128.746; −128.062; −127.373; −126.662; −125.965; −125.254; −124.575; −123.912; −123.260; −122.607; −121.936; −121.263; −120.599; −119.937; −119.274; −118.624; −117.939; −117.258; −116.569; −115.858; −115.167; −114.480; −113.796; −113.115; −112.413; −111.702; −111.003; −110.286; −109.568; −108.862; −108.146; −107.452; −106.758; −106.048; −105.318; −104.572; −103.830; −103.077; −102.339; −101.608; −100.886; −100.161; −99.437; −98.720; −97.992; −97.251; −96.504; −95.754; −95.001; −94.240; −93.471; −92.718; −91.969; −91.236; −90.500; −89.760; −89.021; −88.273; −87.520; −86.770; −86.025; −85.268; −84.521; −83.782; −83.042; −82.289; −81.534; −80.789; −80.038; −79.287; −78.528; −77.775; −77.028; −76.281; −75.543; −74.804; −74.061; −73.309; −72.548; −71.788; −71.029; −70.266; −69.512; −68.772; −68.032; −67.312; −66.586; −65.869; −65.143; −64.401; −63.655; −62.905; −62.155; −61.410; −60.665; −59.916; −59.181; −58.435; −57.703; −56.962; −56.217; −55.480; −54.747; −54.019; −53.291; −52.562; −51.831; −51.097; −50.369; −49.638; −48.919; −48.205; −47.491; −46.781; −46.086; −45.396; −44.698] (unit: dBm)

Table A31 may be represented in another format as shown in Table 12 below.

TABLE 12

A 7-bit RSRP table based on non-uniform quantization

| Quantized Output | RSRP ranges |
|---|---|
| 0000000 | RSRP ≤ −137.408 dBm |
| 0000001 | −137.408 dBm < RSRP ≤ −136.055 dBm |
| 0000010 | −136.055 dBm < RSRP ≤ −134.982 dBm |
| ... | ... |
| 1111101 | −46.086 dBm < RSRP ≤ −45.396 dBm |
| 1111110 | −45.396 dBm < RSRP ≤ −44.698 dBm |
| 1111111 | −44.698 dBm < RSRP |

Table 12 may have characteristics similar to Table 3 and Table 8. For example, Table 12 may map multiple RSRP ranges to multiple quantized outputs, respectively. The multiple RSRP ranges may include a first RSRP range and a second RSRP range. A first power level of the first RSRP range may be lower than a second power level of the second RSRP range, and the first RSRP range may be larger than the second RSRP range. Each RSRP range may have a corresponding power level, and the RSRP range may decrease as the corresponding power level increases.

The performance gain may be evaluated in terms of MSE between the input RSRP values and the quantized codepoints. As shown in Table 13 below, the non-uniform quantization table can reduce the MSE up to 45%, compared to the uniform quantization table.

TABLE 13

Performance Comparison for 7-bit RSRP Tables

| Quantization schemes | MSE | Performance Gain |
|---|---|---|
| Uniform quantization (Table 1) | 0.083382 | baseline |
| Non-uniform quantization (Table 12) | 0.045086 | 45.928% |

Case #3-2: 4-Bit Differential RSRP Table—Non-Uniform Quantization

Similar to the procedure introduced in Case #1-2 (two RSRP values uniformly generated), a non-uniform quantization table A32 (no reserved codepoints) may be given below. Table A32=[−77.5733; −68.3519; −60.9906; −54.5123; −48.7054; −43.2718; −38.1133; −33.3593; −28.8666; −24.4065; −20.0346; −15.7791; −11.6584; −7.6775; −3.7993] (unit: dBm)

Table A32 may be represented in another format as shown in Table 14 below.

TABLE 14

A 4-bit differential RSRP table based on non-uniform quantization

| Quantized Output | RSRP Range |
|---|---|
| 0000 | Differential RSRP ≤ −77.5733 dBm |
| 0001 | −77.5733 dBm < Differential RSRP ≤ −68.3519 dBm |
| ... | ... |
| 1110 | −7.6775 dBm < Differential RSRP ≤ −3.7993 dBm |
| 1111 | −3.7993 dBm < Differential RSRP |

Table 14 may have characteristics similar to Table 5. For example, Table 14 may map multiple RSRP ranges to multiple quantized outputs, respectively. The multiple RSRP ranges may include a third RSRP range and a fourth RSRP range. A third power level of the third RSRP range may be lower than a fourth power level of the fourth RSRP range, and the third RSRP range may be larger than the fourth RSRP range. Each RSRP range may have a corresponding power level, and the RSRP range may decrease as the corresponding power level increases.

Case #3-3: 4-Bit Differential RSRP Table—Uniform Quantization

In one implementation, a uniform quantization table (e.g., 4-bit quantization table) may be used for the differential RSRP values. The step size of 2 (as used in Table 2) may be treated as a baseline. The performance gain of different step sizes may be evaluated in MSE between the input RSRP values and the quantized codepoints. Comparison between non-uniform quantization and uniform quantization with different step sizes (for 2 RSRP group based beam reporting) may be listed in Table 15 below.

TABLE 15

Performance comparison for 4-bit differential RSRP tables

| Quantization schemes | | MSE | Performance Gain |
|---|---|---|---|
| Uniform quantization | with step size of 2 | 360.55786 | baseline |
| | with step size of 3 | 135.53882 | 62.409% |
| | with step size of 4 | 37.91372 | 89.485% |
| | with step size of 5 | 7.32155 | 97.969% |
| | with step size of 6 | 3.09162 | 99.143% |
| | with step size of 7 | 4.08844 | 98.866% |
| | with step size of 8 | 5.32938 | 98.522% |
| Non-uniform quantization | | 3.06006 | 2.80982 |

As shown in Table 15, when the step size is greater than 2, the quantization error may be greatly reduced. In one implementation, the step size for uniform quantization may be greater than 2 dB. Moreover, the performance gain may be higher than 97% when the step size is greater than 4 dB. In one implementation, the step size for uniform quantization may range from 5 dB to 8 dB. In addition, the optimum step size may be 6 dB, which can reduce the MSE up to 99%. In one implementation, the step size for uniform quantization may be equal to 6 dB. In one implementation, the step size for uniform quantization may be fixed and stored in the UE. In one implementation, the step size for uniform quantization may be dynamically configured by the base station. For example, the UE may receive a message from the base station, and the message may indicate the step size for uniform quantization. The message may be an RRC message, a MAC CE message, or a DCI message.

Case #4: Tables for 4 RSRP Values without Reserved Codepoints

In one implementation, for a non-uniform quantization scheme, it is possible to fully use 7 bits and 4 bits to build quantization tables without any reserved codepoints.

Case #4-1: 7-Bit RSRP Table

Similar to the procedure introduced in Case #2-1 (four RSRP values uniformly generated), a non-uniform quantization table A41 (no reserved codepoints) may be given as below. Table A41=[−130.418; −127.993; −126.162; −124.595; −123.314; −122.110; −121.009; −120.005; −118.998; −118.056; −117.167; −116.282; −115.385; −114.517; −113.617; −112.766; −111.928; −111.166; −110.409; −109.620; −108.887; −108.167; −107.465; −106.765; −106.077; −105.381; −104.693; −104.012; −103.342; −102.677; −101.973; −101.294; −100.630; −99.967; −99.314; −98.654; −98.007; −97.349; −96.683; −96.023; −95.389; −94.746; −94.110; −93.478; −92.850; −92.209; −91.583; −90.955; −90.328; −89.692; −89.055; −88.420; −87.787; −87.141; −86.512; −85.868; −85.235;

−84.613; −83.983; −83.362; −82.737; −82.105; −81.484;
−80.862; −80.228; −79.605; −78.973; −78.346; −77.717;
−77.092; −76.472; −75.854; −75.231; −74.617; −73.998;
−73.380; −72.756; −72.129; −71.505; −70.894; −70.288;
−69.679; −69.076; −68.475; −67.867; −67.260; −66.656;
−66.057; −65.449; −64.838; −64.238; −63.645; −63.061;
−62.477; −61.888; −61.302; −60.719; −60.143; −59.556;
−58.977; −58.399; −57.826; −57.258; −56.693; −56.126;
−55.562; −54.999; −54.443; −53.892; −53.339; −52.789;
−52.247; −51.710; −51.177; −50.644; −50.117; −49.594;
−49.067; −48.543; −48.022; −47.496; −46.970; −46.451;
−45.943; −45.445; −44.956; −44.476] (unit: dBm)

Table A41 may be represented in another format as shown in Table 16 below.

TABLE 16

A 7-bit RSRP table based on non-uniform quantization

| Quantized Output | RSRP ranges |
|---|---|
| 0000000 | RSRP ≤ −130.418 dBm |
| 0000001 | −130.418 dBm < RSRP ≤ −127.993 dBm |
| 0000010 | −127.993 dBm < RSRP ≤ −126.162 dBm |
| ... | ... |
| 1111101 | −45.445 dBm < RSRP ≤ −44.956 dBm |
| 1111110 | −44.956 dBm < RSRP ≤ −44.476 dBm |
| 1111111 | −44.476 dBm < RSRP |

Table 16 may have characteristics similar to Table 3 and Table 8. For example, Table 12 may map multiple RSRP ranges to multiple quantized outputs respectively. The multiple RSRP ranges may include a first RSRP range and a second RSRP range. A first power level of the first RSRP range may be lower than a second power level of the second RSRP range, and the first RSRP range may be larger than the second RSRP range. Each RSRP range may have a corresponding power level, and the RSRP range may decrease as the corresponding power level increases.

The performance gain may be evaluated in terms of MSE between the input RSRP values and the quantized codepoints. As shown in Table 17 below, the non-uniform quantization table can reduce the MSE up to 65%, compared to the uniform quantization table.

TABLE 17

Performance Comparison for 7-bit RSRP Tables

| Quantization schemes | MSE | Performance Gain |
|---|---|---|
| Uniform quantization (Table 1) | 0.083411 | baseline |
| Non-uniform quantization (Table 16) | 0.028385 | 65.970% |

Case #4-2: 4-Bit Differential RSRP Table—Non-Uniform Quantization

Similar to the procedure introduced in Case #2-2 (four RSRP values uniformly generated), a non-uniform quantization table A42 (no reserved codepoints) may be given below. Table A42=[−81.3321; −73.4146; −66.7134; −60.6522; −54.9758; −49.5671; −44.3465; −39.2460; −34.2361; −29.2705; −24.3734; −19.4866; −14.6116; −9.7296; −4.8644] (unit: dBm)

Table A42 may be represented in another format as shown in Table 18 below.

TABLE 18

A 4-bit differential RSRP table based on non-uniform quantization

| Quantized Output | RSRP Range |
|---|---|
| 0000 | Differential RSRP ≤ −81.3321 dBm |
| 0001 | −81.3321 dBm < Differential RSRP ≤ −73.4146 dBm |
| ... | ... |
| 1110 | −9.7296 dBm < Differential RSRP ≤ −4.8644 dBm |
| 1111 | −4.8644 dBm < Differential RSRP |

Table 18 may have characteristics similar to Table 5. For example, Table 18 may map multiple RSRP ranges to multiple quantized outputs respectively. The multiple RSRP ranges may include a third RSRP range and a fourth RSRP range. A third power level of the third RSRP range may be lower than a fourth power level of the fourth RSRP range, and the third RSRP range may be larger than the fourth RSRP range. Each RSRP range may have a corresponding power level, and the RSRP range may decrease as the corresponding power level increases.

Case #4-3: 4-Bit Differential RSRP Table—Uniform Quantization

In one implementation, a uniform quantization table (e.g., 4-bit quantization table) may be used for the differential RSRP values. The step size of 2 (as used in Table 2) may be treated as a baseline. The performance gain of different step sizes may be evaluated in MSE between the input RSRP values and the quantized codepoints. Comparison between non-uniform quantization and uniform quantization with different step sizes (for 4 RSRP group based beam reporting) may be listed in Table 19 below.

TABLE 19

Performance comparison for 4-bit differential RSRP tables

| Quantization schemes | | MSE | Performance Gain |
|---|---|---|---|
| Uniform quantization | with step size of 2 | 548.37189 | baseline |
| | with step size of 3 | 220.18700 | 62.409% |
| | with step size of 4 | 65.18358 | 89.485% |
| | with step size of 5 | 11.87429 | 97.969% |
| | with step size of 6 | 3.18342 | 99.143% |
| | with step size of 7 | 4.08034 | 98.866% |
| | with step size of 8 | 5.34905 | 98.522% |
| Non-uniform quantization | | 3.06006 | 2.76897 |

As shown in Table 19, when the step size is greater than 2, the quantization error may be greatly reduced. In one implementation, the step size for uniform quantization may be greater than 2 dB. Moreover, the performance gain may be higher than 97% when the step size is greater than 4 dB. In one implementation, the step size for uniform quantization may range from 5 dB to 8 dB. In addition, the optimum step size may be 6 dB, which can reduce the MSE up to 99% of. In one implementation, the step size for uniform quantization may be equal to 6 dB. In one implementation, the step size for uniform quantization may be fixed and stored in the UE. In one implementation, the step size for uniform quantization may be dynamically configured by the base station. For example, the UE may receive a message from the base station, and the message may indicate the step size for uniform quantization. The message may be an RRC message, a MAC CE message, or a DCI message.

Figure 9:
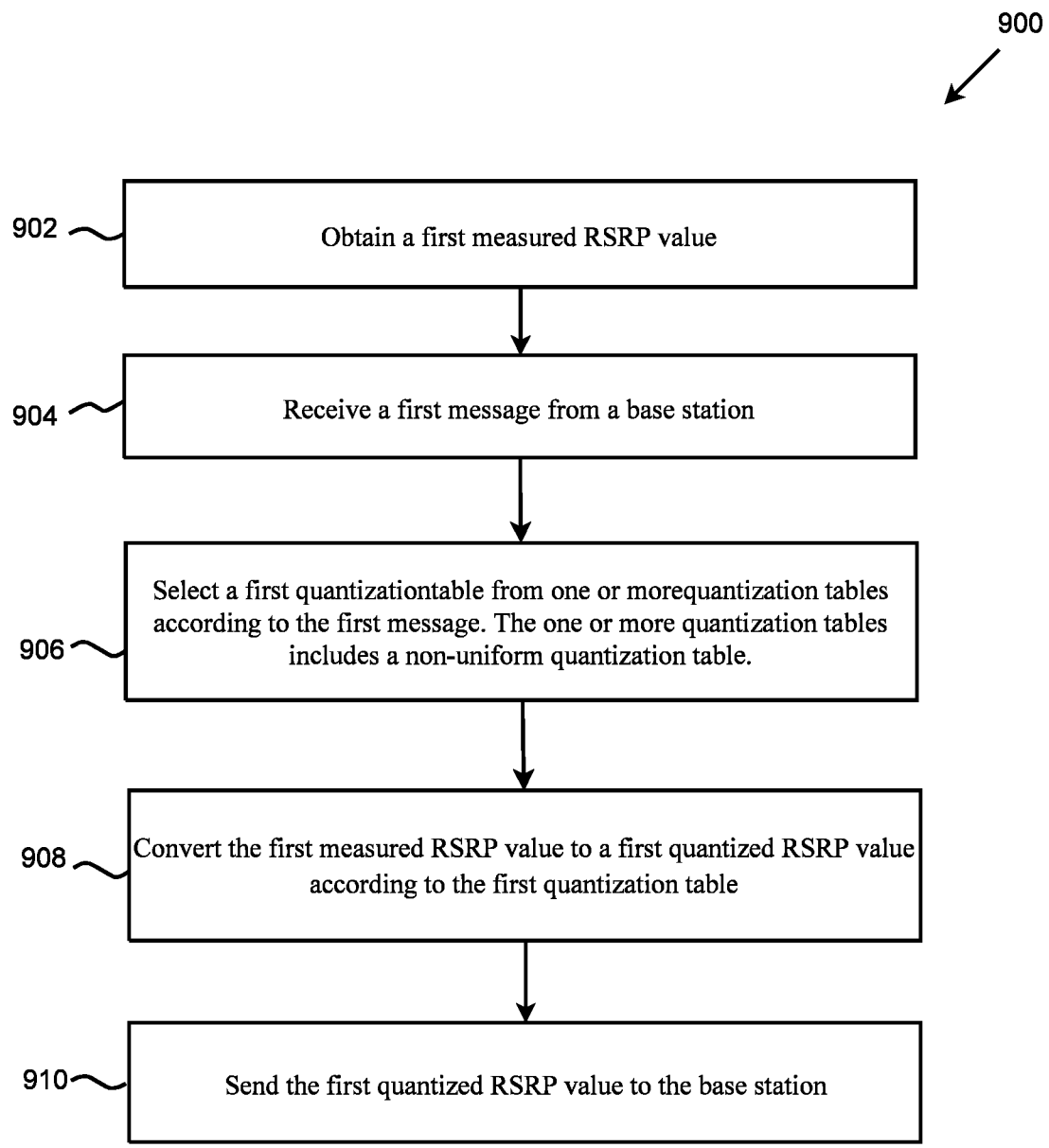
FIG. 9 is a flowchart for a method of reporting RSRP performed by a UE, according to an example implementation of the present application.

FIG. 9 is a flowchart for a method of reporting RSRP performed by a UE, according to an example implementation of the present application. The method 900 may include actions 902, 904, 906, 908 and 910. In action 902, the UE may obtain a first measured RSRP value. For example, if group based beam reporting is not enabled, the first measured RSRP value may be a single measured RSRP value. If group based beam reporting is enabled, the first measured RSRP value may be the largest RSRP value in the group. In action 904, the UE may receive a first message from the base station. In action 906, the UE may select a first quantization table from one or more quantization tables according to the first message. In one implementation, the one or more quantization tables may include a non-uniform quantization table, such as Table 3, Table 8, Table 12, or Table 16. In one implementation, the one or more quantization tables may further include a uniform quantization table. In action 908, the UE may convert the first measured RSRP value to a first quantized RSRP value according to the first quantization table. In action 910, the UE may send the first quantized RSRP value to the base station, and thus the procedure of reporting RSRP may be completed.

In one implementation, the first message may be an RRC message, a MAC CE message, or a DCI message. That is, the base station may configure the quantization table for the UE via signaling in various layers, such as RRC layer, MAC layer, or physical layer.

In one implementation, the one or more quantization tables may include a uniform quantization table and a non-uniform quantization table. The first message may indicate whether to use the uniform quantization table (e.g., Table 1) or the non-uniform quantization table (e.g., Table 3, Table 8, Table 12, or Table 16) during the procedure of RSRP reporting. For example, the first message may include one 'table indication' bit to indicate which table to be used. The table indication bit may be set to 0 when the uniform quantization table is used, and may be set to 1 when the non-uniform quantization table is used.

In one implementation, the non-uniform quantization table may be fixed and stored in the UE. For example, at least one of the Table 3, Table 8, Table 12, and Table 16 may be stored in the UE. When the base station transmits the first message to indicate the non-uniform quantization scheme, the UE may refer to its pre-stored table to perform the non-uniform quantization process. In one implementation, the UE may store multiple non-uniform quantization tables, and the UE may select one of the stored non-uniform quantization tables according to the first message.

In certain scenarios, the UE may fail to receive the first message from the base station. In one implementation, when the UE does not successfully receive the first message from the base station, the UE may convert the first measured RSRP value to the first quantized RSRP value according to a default quantization table. The default quantization table may be a table used in a previous procedure, a table recently used, a fixed table pre-stored in the UE, etc.

If group based beam reporting is enabled, the UE may further perform the following actions. There may be 2 RSRP values within a group when the group based beam reporting is enabled. In addition to the first measured RSRP value, the UE may obtain a second measured RSRP value. The UE may obtain a first differential RSPR value by calculating a difference value between the first measured RSRP value and the second measured RSRP value. The UE may convert the first differential RSRP value to a first quantized differential RSRP value according to a second quantization table. The second quantization table may be configured by the base station or preconfigured at the UE. The second quantization table may be a non-uniform quantization table (e.g., Table 5 and Table 14) or a uniform quantization table (e.g., Table 6). In one implementation, the base station may indicate to the UE whether to use the non-uniform quantization table or the uniform quantization table. In one implementation, the step size of the uniform quantization table may be configured by the base station. Performance comparison with respect to different step sizes may be similar to what is shown in Table 7 and Table 15. The UE may send the first quantized differential RSRP value to the base station.

In one implementation, there may be more than 2 RSRP values (e.g., 4 RSRP values) within a group if the group based beam reporting is enabled. In such a case, the UE may further perform the following actions. The UE may obtain a plurality of measured RSRP values, wherein the plurality of measured RSRP values include the first measured RSRP value. The UE may select a reference RSRP value among the plurality of measured RSRP values. In one implementation, the reference RSRP value may be the largest RSRP value among the plurality of measured RSRP values. The UE may obtain a plurality of differential RSRP values by calculating a plurality of difference values between the reference RSRP value and each of the plurality of measured RSRP values. In one implementation, the UE may subtract the largest RSRP value from each measured RSRP value to obtain the differential RSRP values. The UE may convert the plurality of differential RSRP values to a plurality of quantized differential RSRP values according to a third quantization table. The third quantization table may be configured by the base station or preconfigured at the UE. The third quantization table may be a non-uniform quantization table (e.g., Table 10 and Table 18) or a uniform quantization table (e.g., Table 6). In one implementation, the base station may indicate to the UE whether to use the non-uniform quantization table or the uniform quantization table. In one implementation, the step size of the uniform quantization table may be configured by the base station. Performance comparison with respect to different step sizes may be similar to what is shown in Table 11 and Table 19. The UE may send the plurality of quantized differential RSRP values to the base station.

Case #5-1: Using the Quantized Largest RSRP Value

In one implementation, the differential RSRP value may be calculated with a reference to the largest measured L1-RSRP value. However, the measured value may result in abnormal cases. For example, the measured value may be out of the measurement range. In one implementation, the quantized largest RSRP value may be used as a reference to calculate the differential RSRP values.

Case #5-2: Configurable Quantization Tables for Different Needs

In one implementation, one pair of tables (e.g., a table for the reference RSRP and a table for the differential RSRP) may be used for group-based beam reporting. In one implementation, depending on what is needed for quantization accuracy, configurable quantization tables may be supported. Configurable quantization tables may effectively include more than two quantization tables.

Case #5-3: Configured by Explicit Signalling

The base station (e.g. gNB) may use an RRC message to configure a UE to use different quantization tables. These tables may be predetermined or predefined. In one implementation, there may be an information element (IE) in the RRC message to indicate which quantization table to be used. In one implementation, the base station may use a MAC CE message or a DCI message to indicate the quantization table. In one implementation, the base station may use an RRC message to configure a table list to the UE, and then the base station may use MAC-CE and/or DCI signalling to trigger one table in the given table list to achieve a better dynamic table selection.

Table updating may be achieved using a single list, or two different lists. In one implementation, the single list may contain all elements to reconfigure the list by a single RRC message. In one implementation, two different lists may update the list using multiple RRC messages. One list may be used to convey elements to be added or modified in the list, and the other list may convey the identities (IDs) of the list elements to be released.

This alternative may support at least two extreme cases: the first is high quality multiple RSRP values by using more than 7 bits for an RSRP table and 4 bits for a differential RSRP table; the second case is to only quantize the order of the measured RSRP values in the observation range, or even only to quantize how many beams overpass a given threshold.

In one implementation, rather than being informed by the gNB, the UE may report which table it uses. There may be an information element (IE) in L1-RSRP reporting to indicate the table index. One example is shown in Table 20 below.

TABLE 20

Information Element to indicate the table index

| Quantization tables | Information element |
|---|---|
| Uniform tables | 0 |
| Non-uniform tables | 1 |

As shown in Table 20, the information element may be one bit. This one-bit information may be reported with quantized L1-RSRP.

Case #5-4: Configured by Implicit Signalling

In one implementation, if a lower block error rate (BLER) modulation coding scheme (MCS) is applied (e.g., a new radio network temporary identifier (RNTI)), the 7-bit quantization table may be implicitly indicated. The 7-bit quantization table may be used to support the intention for lower BLER. In one implementation, if the table list is configured, the activation/deactivation DCIs may be validated by combinations of bitfield values.

Case #5-5: Configurable Quantization Region for Different Needs

In one implementation, only one quantization region may be allowed (e.g., from −140 dBm to −44 dBm). In one implementation, depending on what is needed, the gNB may configure different quantization regions to the UE. The configuration may be signalled by an RRC message, a MAC-CE message, and/or a DCI message. For instance, a smaller quantization region may be configured from −60 dBm to −44 dBm and a larger quantization region may be set from −200 dBm to −10 dBm.

Case #5-6: Reporting Overhead Reduction

Several implementations may be considered to reduce the reporting overhead.

In one implementation, the above-described non-uniform quantization may be used to build smaller tables with less overhead. If the available reporting block size is fixed, regardless of the number of group beams, the UE may choose one of the tables to be used and report the selected table to the gNB. In one implementation, the gNB may choose one of the tables to be used and configure the selected table to the UE.

In one implementation, the UE may set different thresholds for the largest measured RSRP values to be quantized by the 7-bit table. The UE may (a) drop values that are under the threshold (e.g., too small to be useful) and (b) drop values that are abnormal (e.g., too large to be true).

In one implementation, the UE may set the thresholds for the differential RSRP values to be quantized by the 4-bit table. The UE may (a) drop values that are too large (e.g., far from the largest RSRP value) and (b) drop values that are abnormal (e.g., the second largest RSRP value is larger than the largest one).

Case #5-7: Some Possible Use Cases

Embodiments in the present application may be used to replace the conventional quantization methods, or may coexist with the conventional quantization methods, with a dynamic selection mechanism to provide better quantization quantity. The combination of these alternatives may be able to support the following use cases or operations.

(1) beam offloading within a cell (e.g., assume several beams have good quality, and the gNB may assign a beam with appropriate loading to serve the UE).

(2) NR-U operation (e.g., the RSRP may be used as Listen Before Talk (LBT) measurement and better to have fine value with respect to each beam).

(3) beam level handover (HO) (e.g., UE may report fine granularity for all beams order to facilitate HO event trigger).

(4) multiple Transmission Reception Points (TRPs) (e.g., cooperated transmission based on multiple base stations, and to provide high quality quantized values when the gNBs exchange RSRP information for a better RSRP ordering).

(5) multiple-user Multi-input Multi-output (MIMO) (e.g., multiple UEs may share the same resource blocks (RBs) but may have different quantization tables).

(6) multiple groups of beam reports for a better joint RSRP processing (e.g., joint RSRP ordering) from the following different sources: (a) serving cells, e.g., P-cell, S-cell, PS-cell, etc. (b) component carriers (CCs), (c) bandwidth parts (BWPs), (d) subcarrier spacings (SCSs), (e) control and share channels (Physical Downlink Control Channel (PDCCH) and Physical Downlink Shared Channel (PDSCH)), (f) transmission types, e.g., types1/type2 configured grant, grant-free transmission, etc. (g) OFDM types (DFT-s-OFDM and CP-OFDM), (h) TX spatial filtering, e.g., precoding resource groups (PRG), precoding resource blocks (PRB), etc, (i) RX spatial filtering, e.g., RX beam, (j) antenna patterns, e.g., antenna panels, antenna groups, etc, (k) Quasi-Co-Locations (QCLs) assumptions, (l) UE Locations, (m) time domain granularity, e.g., TBs, RBs, frames, slots, symbols, absolute time, etc, (n) procedures, e.g., initial access, handover, contention-based random access channel (RACH), contention-free RACH, etc. (o) service requirement, e.g., URLLC, eMBB, IOT, V2X, etc. (p) comparability, e.g., 4G, 5G, 6G, Wifi, Lifi, etc.

When the quantization tables are configured per the above-mentioned sources, e.g., per CC, per BWP, per SCS, per PDCCH, or associated with some settings, e.g., associated with QCL, associated with OFDM type, the above-mentioned DCI/MAC CE based trigger may activate single table in one source, or activate multiple tables for multiple sources, e.g., one DCI may activate multiple tables in multiple CCs.

Case #5-8: Related Mechanism when Multiple Quantization Tables Exist

Several implementations may be considered when multiple quantization tables exist.

(1) Selection of quantization tables may be UE-specific RRC configured.

(2) A specific DCI may be used for different tables.

(3) A specific RNTI may be used for different tables.

(4) The size of quantization table(s) may be limited with concerns for scheduling flexibility.

(5) For a UE simultaneously being configured with multiple tables, mechanisms may be needed to inform the UE what quantization table to be used. Such mechanisms may include the above-mentioned DCI/MAC CE based trigger.

(6) Some fields in DCI may be shortened and included as part of a new DCI format to support multiple quantization tables.

(7) A UE may report the preferred quantization tables based on the UE's capability at a given carrier frequency, for each subcarrier spacing applicable to data channel at this carrier frequency. Several related implementations are given below.

(a) An entry may exist in the UE's capability list for RSRP quantization tables.

(b) The UE may signal the gNB whether multiple quantization tables are supported. Further properties (e.g., at most how many tables the UE can support, the processing time with respect to different quantization process, etc.) may be appended during the capability negotiation.

(c) If the UE cannot support multiple quantization tables, the UE may signal the gNB which quantization table it prefers.

(d) If the UE supports multiple quantization tables, the UE may signal the gNB which quantization table it prefers.

(8) In MU-MIMO with dynamic grant-based operation, the gNB may schedule multiple UEs such that they occur in the same resources, but use different RSRP quantization tables. The use of different quantization tables may allow the gNB to produce independent RSRP ordering and/or joint RSRP ordering for the co-scheduled UEs.

(9) For RSRP reporting reduction, the related thresholds for dropping values may be related to scheduled tables.

(10) There may be a default quantization table before the gNB configures any table.

(11) For MAC layer, the gNB may know which quantization table to be configured while network may want a specific traffic class to use only certain types of quantization tables.

(a) Based on the selected quantization table, the gNB may grant a proper resource for a certain need.

(b) Based on the selected quantization table, the gNB may enable certain features, e.g., duplication, for a need.

(12) Since there may be multiple possible tables to use, the table for uplink grants may be different between initial transmission and retransmissions.

Case #5-9: Default Quantization Table

Since there may be multiple quantization tables, there may be a default quantization table before configuration. Several implementations are given below.

(1) Specified in the specification, e.g., there may exist a common quantization table for all UEs as a default table.

(2) Following the same setting in some previous procedures, e.g., before an initial access.

(3) Following the most recent used table, e.g., the most recent indicated table. If there is no such table, the UE may apply a default table in the specification or a default table defined by the gNB.

(4) This default setting (default quantization table) may be changed by RRC reconfiguration, MAC-CE, and/or DCI.

(5) If RRC reconfiguration for quantization tables contains multiple tables as a table list, the RRC message may point out which one is a default quantization table.

(a) An inexplicit method may use entry ordering in this table list.

(b) An inexplicit method may use the first and/or lowest entry as a default setting.

(c) An inexplicit method may use entry repetition as means to set a default.

(d) An inexplicit method may be left to the gNB's implementation.

(6) If RRC reconfiguration for quantization tables contains multiple tables as a table list, the RRC message may point out that the order of entries in the list represents the priority order to be used by the UE.

(7) If RRC reconfiguration for quantization tables contains multiple tables as a table list, the configuration of the indicated table may be valid after the UE decodes this RRC message.

(8) There may exist an ambiguous time for the UE to decode the RRC message. During this period, the RRC message may not be valid. Before this RRC message becoming valid, the UE may use a configured table, or a default table, as mentioned above.

Figure 10:
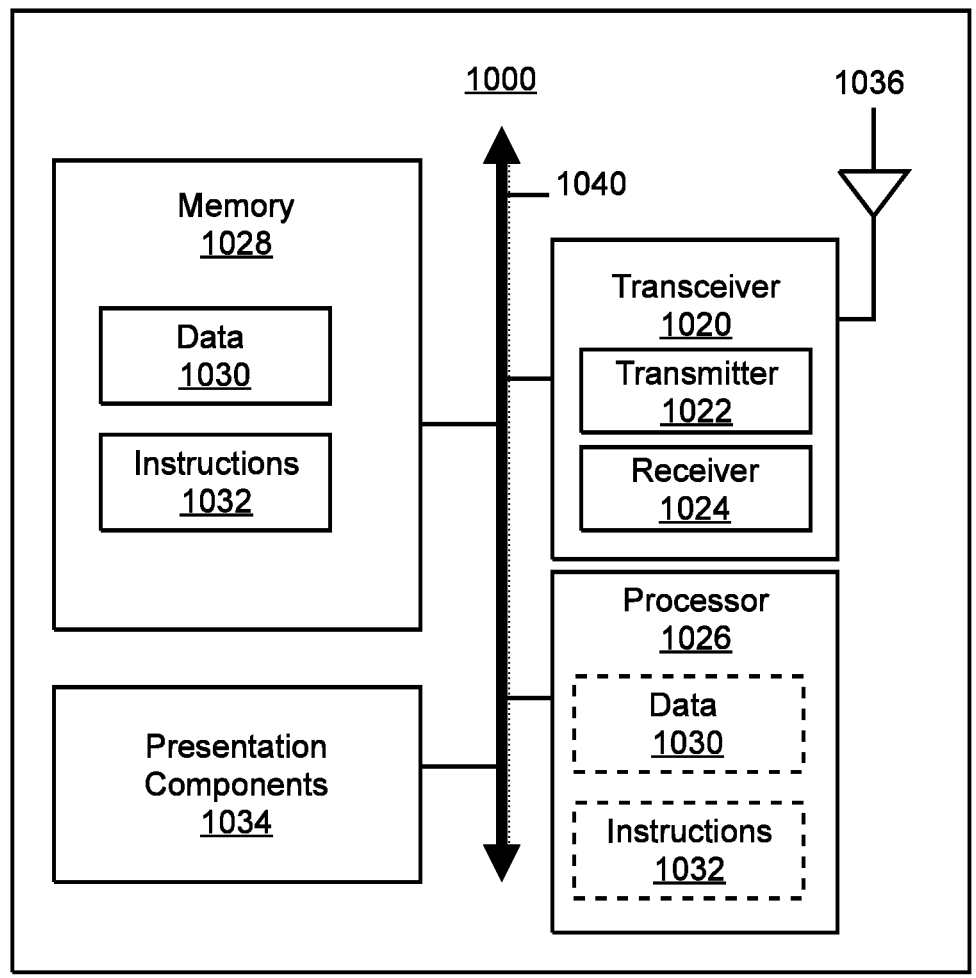
FIG. 10 illustrates a block diagram of a node for wireless communication, in accordance with various aspects of the present application.

FIG. 10 illustrates a block diagram of a node for wireless communication, in accordance with various aspects of the present application. As shown in FIG. 10, node 1000 may include transceiver 1020, processor 1026, memory 1028, one or more presentation components 1034, and at least one antenna 1036. Node 1000 may also include a Radio Frequency (RF) spectrum band module, a base station communications module, a network communications module, and a system communications management module, input/output (I/O) ports, I/O components, and power supply (not explicitly shown in FIG. 10). Each of these components may be in communication with each other, directly or indirectly, over one or more buses 1040.

Transceiver 1020 having transmitter 1022 and receiver 1024 may be configured to transmit and/or receive time and/or frequency resource partitioning information. In some implementations, transceiver 1020 may be configured to transmit in different types of subframes and slots including, but not limited to, usable, non-usable and flexibly usable subframes and slot formats. Transceiver 1020 may be configured to receive data and control channels.

Node 1000 may include a variety of computer-readable media. Computer-readable media can be any available media that can be accessed by node 1000 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1028 may include computer-storage media in the form of volatile and/or non-volatile memory. Memory 1028 may be removable, non-removable, or a combination thereof. Example memory includes solid-state memory, hard drives, optical-disc drives, and etc. As illustrated in FIG. 10, memory 1028 may store computer-readable, computer-executable instructions 1032 (e.g., software codes) that are configured to, when executed, cause processor 1026 to perform various functions described herein, for example, with reference to FIG. 9 and quantization mappings shown in FIG. 3 through FIG. 6. Alternatively, instructions 1032 may not be directly executable by processor 1026 but be configured to cause node 1000 (e.g., when compiled and executed) to perform various functions described herein.

Processor 1026 may include an intelligent hardware device, e.g., a central processing unit (CPU), a microcontroller, an ASIC, and etc. Processor 1026 may include memory. Processor 1026 may process data 1030 and instructions 1032 received from memory 1028, and information through transceiver 1020, the base band communications module, and/or the network communications module. Processor 1026 may also process information to be sent to transceiver 1020 for transmission through antenna 1036, to the network communications module for transmission to a core network.

One or more presentation components 1034 presents data indications to a person or other device. Exemplary one or more presentation components 1034 include a display device, speaker, printing component, vibrating component, and etc.

From the above description, it is manifest that various techniques can be used for implementing the concepts described in the present application without departing from the scope of those concepts. Moreover, while the concepts have been described with specific reference to certain implementations, a person of ordinary skill in the art may recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A user equipment (UE), comprising:
one or more non-transitory computer-readable media having computer-executable instructions embodied thereon; and
at least one processor coupled to the one or more non-transitory computer-readable media, and configured to execute the computer-executable instructions to:
obtain a first measured RSRP value;
receive a first message from a base station;
select a first quantization table from one or more quantization tables according to the first message, wherein the one or more quantization tables comprises a non-uniform quantization table;
convert the first measured RSRP value to a first quantized RSRP value according to the first quantization table; and
send the first quantized RSRP value to the base station, wherein the at least one processor is further configured to execute the computer-executable instructions to:
obtain a second measured RSRP value;
obtain a first differential RSRP value by calculating a difference value between the first measured RSRP value and the second measured RSRP value;
convert the first differential RSRP value to a first quantized differential RSRP value according to a second quantization table that is not among the one or more quantization tables; and
send the first quantized differential RSRP value to the base station.

2. The UE of claim 1, wherein the non-uniform quantization table maps a plurality of RSRP ranges to a plurality of quantized outputs respectively, wherein the plurality of RSRP ranges comprises a first RSRP range and a second RSRP range, wherein a first power level of the first RSRP range is lower than a second power level of the second RSRP range, and the first RSRP range is larger than the second RSRP range.

3. The UE of claim 1, wherein the non-uniform quantization table maps a plurality of RSRP ranges to a plurality of quantized outputs respectively, wherein each RSRP range has a corresponding power level, and the RSRP range decreases as the corresponding power level increases.

4. The UE of claim 1, wherein the second quantization table maps a plurality of RSRP ranges to a plurality of quantized outputs respectively, wherein the plurality of RSRP ranges comprises a first RSRP range and a second RSRP range, wherein a first power level of the first RSRP range is lower than a second power level of the second RSRP range, and the first RSRP range is larger than the second RSRP range.

5. The UE of claim 1, wherein the second quantization table maps a plurality of RSRP ranges to a plurality of quantized outputs respectively, and each of the plurality of RSRP ranges is equal to a step size, and the step size is greater than 2 dB.

6. The UE of claim 5, wherein the step size is equal to 6 dB.

7. The UE of claim 5, wherein the at least one processor is further configured to execute the computer-executable instructions to:
receive a second message from the base station, wherein the second message indicates the step size.

8. The UE of claim 1, wherein the at least one processor is further configured to execute the computer-executable instructions to:
obtain a plurality of measured RSRP values, wherein the plurality of measured RSRP values include the first measured RSRP value;
select a reference RSRP value among the plurality of measured RSRP values;
obtain a plurality of differential RSRP values by calculating a plurality of difference values between the reference RSRP value and each of the plurality of measured RSRP values;
convert the plurality of differential RSRP values to a plurality of quantized differential RSRP values according to a second quantization table that is not among the one or more quantization tables; and
send the plurality of quantized differential RSRP values to the base station.

9. The UE of claim 1, wherein the non-uniform quantization table is fixed and stored in the UE.

10. The UE of claim 1, wherein the one or more quantization tables further comprises a uniform quantization table.

11. The UE of claim 1, wherein the first message comprises one of a radio resource control (RRC) message, a medium access control (MAC) control element (CE) message, and a downlink control information (DCI) message.

12. The UE of claim 1, wherein the at least one processor is further configured to execute the computer-executable instructions to:
convert the first measured RSRP value to the first quantized RSRP value according to a default quantization table, when the UE does not successfully receive the first message from the base station.

13. A method of reporting RSRP performed by a UE, the method comprising:
obtaining a first measured RSRP value;
receiving a first message from a base station;
selecting a first quantization table from one or more quantization tables according to the first message, wherein the one or more quantization tables comprises a non-uniform quantization table;
converting the first measured RSRP value to a first quantized RSRP value according to the first quantization table;
sending the first quantized RSRP value to the base station,
obtaining a second measured RSRP value;
obtaining a first differential RSRP value by calculating a difference value between the first measured RSRP value and the second measured RSRP value;
converting the first differential RSRP value to a first quantized differential RSRP value according to a second quantization table that is not among the one or more quantization tables; and
sending the first quantized differential RSRP value to the base station.

14. The method of claim 13, wherein the non-uniform quantization table maps a plurality of RSRP ranges to a plurality of quantized outputs respectively, wherein the plurality of RSRP ranges comprises a first RSRP range and a second RSRP range, wherein a first power level of the first RSRP range is lower than a second power level of the second RSRP range, and the first RSRP range is larger than the second RSRP range.

15. The method of claim 13, wherein the non-uniform quantization table maps a plurality of RSRP ranges to a plurality of quantized outputs respectively, wherein each RSRP range has a corresponding power level, and the RSRP range decreases as the corresponding power level increases.

16. The method of claim 13, wherein the second quantization table maps a plurality of RSRP ranges to a plurality of quantized outputs respectively, wherein the plurality of RSRP ranges comprises a first RSRP range and a second RSRP range, wherein a first power level of the first RSRP range is lower than a second power level of the second RSRP range, and the first RSRP range is larger than the second RSRP range.

17. The method of claim 13, wherein the second quantization table maps a plurality of RSRP ranges to a plurality of quantized outputs respectively, and each of the plurality of RSRP ranges is equal to a step size, and the step size is greater than 2 dB.

18. The method of claim 17, wherein the step size is equal to 6 dB.

19. The method of claim 17, further comprising:
receiving a second message from the base station, wherein the second message indicates the step size.

20. The method of claim 13, further comprising:
obtaining a plurality of measured RSRP values, wherein the plurality of measured RSRP values include the first measured RSRP value;
selecting a reference RSRP value among the plurality of measured RSRP values;
obtaining a plurality of differential RSRP values by calculating a plurality of difference values between the reference RSRP value and each of the plurality of measured RSRP values;
converting the plurality of differential RSRP values to a plurality of quantized differential RSRP values according to a second quantization table that is not among the one or more quantization tables; and
sending the plurality of quantized differential RSRP values to the base station.

21. The method of claim 13, wherein the non-uniform quantization table is fixed and stored in the UE.

22. The method of claim 13, wherein the one or more quantization tables further comprises a uniform quantization table.

23. The method of claim 13, wherein the first message comprises one of a radio resource control (RRC) message, a medium access control (MAC) control element (CE) message, and a downlink control information (DCI) message.

24. The method of claim 13, further comprising:
converting the first measured RSRP value to the first quantized RSRP value according to a default quantization table, when the UE does not successfully receive the first message from the base station.

* * * * *